United States Patent
Campbell et al.

(10) Patent No.: US 6,427,002 B2
(45) Date of Patent: Jul. 30, 2002

(54) ADVANCED INTERACTIVE VOICE RESPONSE SERVICE NODE

(75) Inventors: Jeffrey W. Campbell, Monument; Henry N. Fly; Allen Holmes, both of Colorado Springs; Daniel Hutton, Elbert; Judy A. Moldenhauer, Colorado Springs; Phyllis D. Santa, Larkspur, all of CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/073,880

(22) Filed: May 7, 1998

(51) Int. Cl.[7] .......................... H04M 1/64; H04M 3/42; H04M 3/00

(52) U.S. Cl. ................ 379/88.01; 379/15.03; 379/201.12; 379/221.03; 379/265.01; 379/266.01

(58) Field of Search .................. 379/88.01, 88.13, 379/67.1, 88.17, 88.19, 91.01, 93.21, 100.12, 100.15, 115, 133, 144, 158, 196, 219, 220, 265, 201.03, 201.12, 207.11, 221.02, 221.03, 221.04, 9.02, 9.03, 9.04, 9.05, 14.01, 15.01, 15.02, 15.03, 15.04, 15.05, 201.01, 265.01, 266.01; 455/403, 415, 461; 340/825.7, 825.8, 826; 709/234, 236, 237

(56) References Cited

U.S. PATENT DOCUMENTS

| | | | |
|---|---|---|---|
| 4,797,910 A | 1/1989 | Daudelin | 379/67 |
| 4,845,739 A | 7/1989 | Katz | 379/92 |
| 4,930,150 A | 5/1990 | Katz | 379/93 |
| 5,048,075 A | 9/1991 | Katz | 379/92 |
| 5,128,984 A | 7/1992 | Katz | 379/92 |
| 5,133,004 A * | 7/1992 | Heileman, Jr. et al. | 379/67.1 |
| 5,165,095 A | 11/1992 | Borcherding | 379/88.03 |
| 5,185,781 A | 2/1993 | Dowden et al. | 379/88.04 |
| 5,251,252 A | 10/1993 | Katz | 379/92 |
| 5,255,309 A | 10/1993 | Katz | 379/88 |
| 5,259,023 A | 11/1993 | Katz | 379/88 |
| 5,325,421 A | 6/1994 | Hou et al. | 379/88.03 |
| 5,349,633 A | 9/1994 | Katz | 379/88 |
| 5,351,285 A | 9/1994 | Katz | 379/94 |
| 5,353,339 A * | 10/1994 | Scobee | 379/207 |
| 5,519,772 A * | 5/1996 | Akman et al. | 379/265 |
| 5,533,115 A * | 7/1996 | Hollenbach et al. | 379/220 |
| 5,553,119 A * | 9/1996 | McAllister et al. | 379/67.1 |
| 5,561,707 A | 10/1996 | Katz | 379/88 |

(List continued on next page.)

OTHER PUBLICATIONS

Emerson, S. Thomas, "Voice Response Systems—Technology to the Rescue for Business Users", Speech Technology, pp. 99–103 (Jan./Feb. 1983).

Hester, et al., "The AT&T Multi–Mode Voice Systems—Full Spectrum Solutions for Speech Processing Applicators", Proceedings of the 1985 AVOIS Conference, pp. 1, 3, 5, 7 and 9 (Sep. 1985).

Moosemiller, John P., "AT&T's Conversant I Voice System", Speech Technology, pp. 88, 90 and 92 (Mar./Apr. 1986).

Perdue, Robert J. and Eugene L. Rissanon, "Conversant 1 Voice System Architecture and Applications" AT&T Technical Journal, pp. 34–47 (Sep./Oct. 1986).

*Primary Examiner*—Allan Hoosain

(57) ABSTRACT

A next generation service node (NGSN) for providing advanced interactive voice response (IVR) services within a telecommunications network. The NGSN includes intelligent peripherals implemented as network audio servers, and application servers which execute customer application files to perform IVR services. The NGSN provides reliability through redundancy of application servers, including automatic application server failover within a node, and automatic node failover between NGSNs. The NGSN features include modular software and hardware architecture with internal function encapsulation. This allows multiple vendors products to be used and provides a common signaling interface to be used to any switch network. Other NGSN features include an open systems architecture with improved scaleability and increased application processing capability.

11 Claims, 4 Drawing Sheets

U.S. PATENT DOCUMENTS

| | | | | |
|---|---|---|---|---|
| 5,572,583 A | * | 11/1996 | Wheeler, Jr. et al. | 379/207 |
| 5,581,600 A | | 12/1996 | Watts et al. | 379/88.02 |
| 5,583,920 A | * | 12/1996 | Wheeler, Jr. | 379/88.13 |
| 5,689,553 A | | 11/1997 | Ahuja et al. | 379/202 |
| 5,692,033 A | | 11/1997 | Farris | 379/67.1 |
| 5,706,286 A | | 1/1998 | Reiman et al. | 370/401 |
| 5,742,905 A | | 4/1998 | Pepe et al. | 455/461 |
| 5,793,771 A | | 8/1998 | Darland et al. | 370/461 |
| 5,802,146 A | | 9/1998 | Dulman | 379/32.03 |
| 5,805,675 A | | 9/1998 | Chanda | 379/93.14 |
| 5,818,921 A | | 10/1998 | Vander Meiden et al. | 379/225 |
| 5,825,752 A | | 10/1998 | Fujimori et al. | 370/260 |
| 5,854,834 A | | 12/1998 | Gottlieb et al. | 379/14.04 |
| 5,867,494 A | | 2/1999 | Krishnaswamy et al. | 370/352 |
| 5,881,131 A | | 3/1999 | Farris et al. | 379/15.03 |
| 5,881,135 A | | 3/1999 | Watts et al. | 379/88.02 |
| 5,883,939 A | * | 3/1999 | Friedman et al. | 379/9 |
| 5,915,008 A | | 6/1999 | Dulman | 379/221.08 |
| 5,917,900 A | | 6/1999 | Allison et al. | 379/229 |
| 5,920,562 A | * | 7/1999 | Christie et al. | 370/395 |
| 5,923,659 A | | 7/1999 | Curry et al. | 370/401 |
| 5,923,859 A | | 7/1999 | Melo et al. | 710/113 |
| 5,926,524 A | | 7/1999 | Taylor | 379/88.08 |
| 5,930,348 A | | 7/1999 | Regnier et al. | 379/221.01 |
| 5,931,914 A | | 8/1999 | Chiu | 709/230 |
| 5,937,029 A | * | 8/1999 | Yosef | 379/1 |
| 5,946,386 A | | 8/1999 | Rogers et al. | 379/265.09 |
| 5,953,389 A | | 9/1999 | Pruett et al. | 379/9 |
| 5,956,396 A | | 9/1999 | Ash et al. | 379/220.01 |
| 5,974,252 A | | 10/1999 | Lin et al. | 717/1 |
| 5,987,118 A | * | 11/1999 | Dickerman et al. | 379/265 |
| 5,987,331 A | | 11/1999 | Grube et al. | 455/509 |
| 5,995,610 A | | 11/1999 | Smidt et al. | 379/207.02 |
| 5,999,525 A | | 12/1999 | Krishnaswamy et al. | 370/352 |
| 6,003,031 A | | 12/1999 | Hartikainen et al. | 707/10 |
| 6,014,428 A | | 1/2000 | Wolf | 379/88.11 |
| 6,018,567 A | | 1/2000 | Dulman | 379/32.03 |
| 6,038,293 A | | 3/2000 | McNerney et al. | 379/88.19 |
| 6,041,325 A | | 3/2000 | Shah et al. | 707/10 |
| 6,044,142 A | | 3/2000 | Hammarstrom et al. | 379/223 |
| 6,044,144 A | | 3/2000 | Becker et al. | 379/265.02 |
| 6,044,259 A | | 3/2000 | Hentila et al. | 455/406 |
| 6,081,591 A | | 6/2000 | Skoog | 379/230 |
| 6,108,410 A | | 8/2000 | Reding et al. | 379/265.03 |
| 6,111,893 A | | 8/2000 | Volftsun et al. | 370/466 |
| 6,122,345 A | | 9/2000 | Johnson | 379/67.1 |
| 6,134,311 A | | 10/2000 | Ekstrom | 379/201 |
| 6,137,862 A | * | 10/2000 | Atkinson et al. | 379/34 |
| 6,144,727 A | | 11/2000 | Mashinsky | 379/114.02 |
| 6,198,813 B1 | | 3/2001 | Pullen et al. | 379/201.01 |
| 6,233,316 B1 | | 5/2001 | Schier et al. | 379/88.03 |

\* cited by examiner

ADVANCED INTERACTIVE VOICE RESPONSE SERVICE NODE

CROSS-REFERENCE TO RELATED APPLICATIONS

This application is related to commonly-owned, co-pending applications filed concurrently herewith, entitled:

"Telecommunications Architecture for Call Center Services Using Advanced Interactive Voice Response Service Nodes" having application Ser. No. 09/074,096 filed May 7, 1998;

"Interactive Voice Response Service Node with Advanced Resource Management" having application Ser. No. 09/074,142 filed May 7, 1998;

"Communications Signaling Gateway and System for an Advanced Service Node" having application Ser. No. 09/074,072 filed May 7, 1998;

"Service Provisioning System for Interactive Voice Response Service" having application Ser. No. 09/074,050 filed May 7, 1998;

"Call and Circuit State Machine for a Transaction Control Layer of a Communications Signaling Gateway" having application Ser. No. 09/073,885 filed May 7, 1998; and "System for Executing Advanced Interactive Voice Response Services Using Service-Independent Building Blocks" having application Ser. No. 09/073,887. The above applications are incorporated herein by reference in their entirety.

BACKGROUND OF THE INVENTION

1. Field of the Invention

The present invention relates generally to computer telephony, and more particularly to providing a platform for advanced interactive voice response service nodes to handle calls on a telephone network.

2. Related Art

Interactive Voice Response (IVR) platforms, also known as Voice Response Units (VRUs) or Audio Response Units (ARUs), are common in the telecommunications industry. It is common for a business that is a customer of an IVR service provider to use IVR services in conjunction with call center services. Interactive voice response service nodes are commonly used for customer call center routing. They perform processing of customer applications, based on one or more criteria selected by the customer, such as the dialed number of a call, Dialed Number Identification Service (DNIS), Automatic Number Identification (ANI), time of day, caller-entered digits, geographic point of call origin, etc. The IVR service nodes can also perform other IVR services such as automated servicing of callers for customers, caller surveys, telemarketing, and call parking until a call center has an available resource (e.g., a customer service agent).

An IVR service node typically includes a network audio server that is connected via voice trunks to a bridging switch on a switch network, and an automated call processor that processes customer IVR applications. FIG. 1 illustrates a typical IVR service node systems architecture 100. Bridging switch 110 is connected to an IVR service node 120 via voice trunks. A call processor 130 is a network audio server that provides the telephony interface between the IVR Service Node 120 and the bridging switch 110. A computer processor 140 stores and executes customer application files to service a call. A disk storage 150 is employed to store customer audio files.

While FIG. 1 illustrates a conventional IVR service node, there are many types of IVR service nodes each with variations in architecture and features. However, all currently available IVR service nodes have several limitations. The current IVR platforms: (1) use monolithic designs; (2) employ proprietary architecture; (3) are non-scaleable; and (4) have limited application processing capability.

First, current IVR platforms use monolithic designs. Several complex functions are realized with the current monolithic designs of IVR platforms. A node's internal processes are designed to accommodate specific external interfaces. Thus, whenever a modification is made to a network switch, database, or other external interfacing component, a significant portion of the IVR service node must be modified. This is undoubtedly costly considering the development, testing, and release processes that are involved.

Second, current IVR platforms employ proprietary architecture. A conventional IVR service node is typically built entirely by a single vendor. This is a significant monetary investment for a carrier to purchase and maintain such equipment. As a result, an IVR service provider (carrier) is dependent upon that vendor's architecture. If a carrier decides to modify its network switch signaling format, it must fund the vendor's development of an IVR service node to accommodate the modifications.

Third, current IVR platforms are non-scaleable. The monolithic design of conventional IVR service nodes severely limit their scaleability. The internal processes, internal interfaces, and external interfaces are so tightly coupled that adding additional components and network ports to a node requires re-engineering. As a result, any increased traffic demand for IVR services requires the addition of IVR service nodes to the network.

Fourth, current IVR platforms have limited application processing capability. The application processors of conventional IVR service nodes are designed so that each customer application is executed as a stand-alone process. This limits the number of applications that can be performed. Also, customers are demanding more customized IVR applications that require specialized architectures. This results in different types of IVR service nodes implemented throughout a network to handle different customer's IVR applications. This results in an inefficient network because a call needing a certain application must be routed to a certain service node irrespective of that node's load.

The above described limitations result in network inefficiencies and costly development of IVR service nodes and applications. Therefore, what is needed is an advanced interactive voice response service node that provides IVR services using a modular open systems architecture with increased application processing capability and improved scaleability.

SUMMARY OF THE INVENTION

The present invention is directed to a system and method for providing advanced interactive voice response (IVR) services within a telecommunications network through a next generation service node (NGSN). The NGSN system includes a plurality of intelligent peripherals interfaced to a telephonic switch network and a pair of redundant application servers. The system further includes a shared disk array networked to the application servers. The system also includes a node monitoring and alarm (a.k.a. management) workstation. The method includes the steps of interfacing a plurality of intelligent peripherals to a telephonic switch network, retrieving customer application files from a shared disk array, and executing customer application files to perform interactive voice response services via dual redundant application servers.

An advantage of the present invention is that it may be modularly designed to encapsulate each function into an individual hardware and/or software component. This makes modification less costly as modifying one function has minimal impact on other functions.

Another advantage of the present invention is that it may be built upon an open systems architecture that may use components from many different vendors. Many of the components are interchangeable and require minimal configuration so that many vendors may be used for any single component.

Another advantage of the present invention is that it may be scaleable. The size of a node may be increased by adding additional intelligent peripherals, the number of nodes may be increased in a network since any node can handle any function of a call.

Yet another advantage of the present invention is the increased capacity to process customer IVR applications. Further features and advantages of the present invention as well as the structure and operation of various embodiments of the invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview

The present invention is directed to an advanced interactive voice response (IVR) service node, referred to as a next generation service node (NGSN). In one operating environment, the NGSN is a platform for providing advanced IVR services to customers of an IVR service provider. In a preferred embodiment of the present invention, a customer may have multiple call centers distributed geographically, all of which are accessed by a single toll-free number. A call to the toll free number is routed by a switch network to the NGSN. The NGSN then performs a customer IVR application, which may prompt the caller for certain information and collect other information (e.g., dialed number, caller ANI, etc.) from the network. Based on the information and possibly other information (e.g., time of day), the NGSN determines to which call center to route the call. The objective is to resolve routing to one of multiple call centers, as well as park calls on the network until a call center termination becomes available.

The present invention is described in terms of the above example environment. This is for convenience only and is not intended to limit the application of the present invention. In fact, after reading the following description, it will be apparent to one skilled in the relevant art how to implement the following invention in alternate embodiments (e.g., performing other IVR services).

Functional Description

Figure 1:
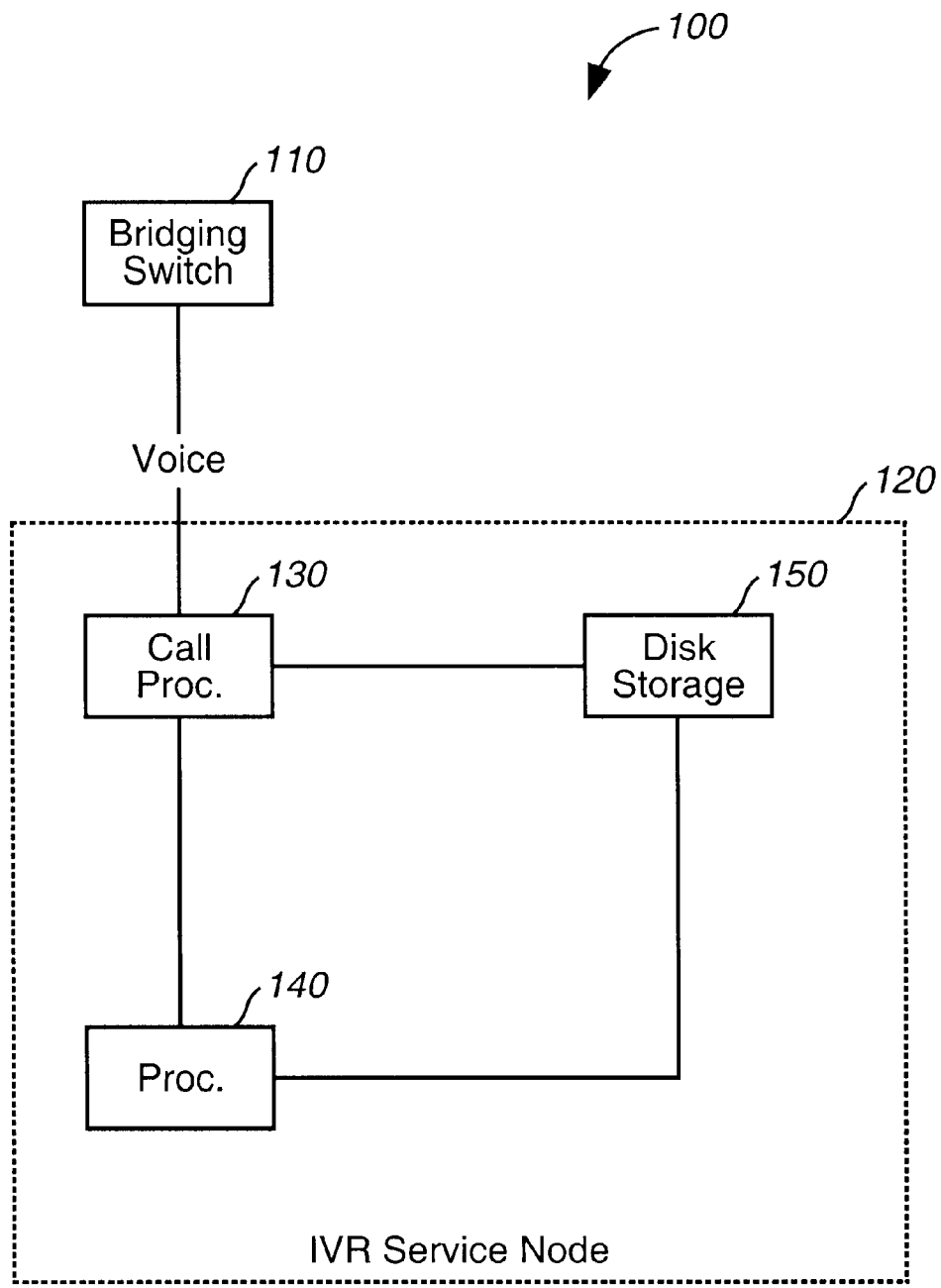
FIG. 1 is a block diagram illustrating the systems architecture of a conventional IVR service node.
Figure 2:
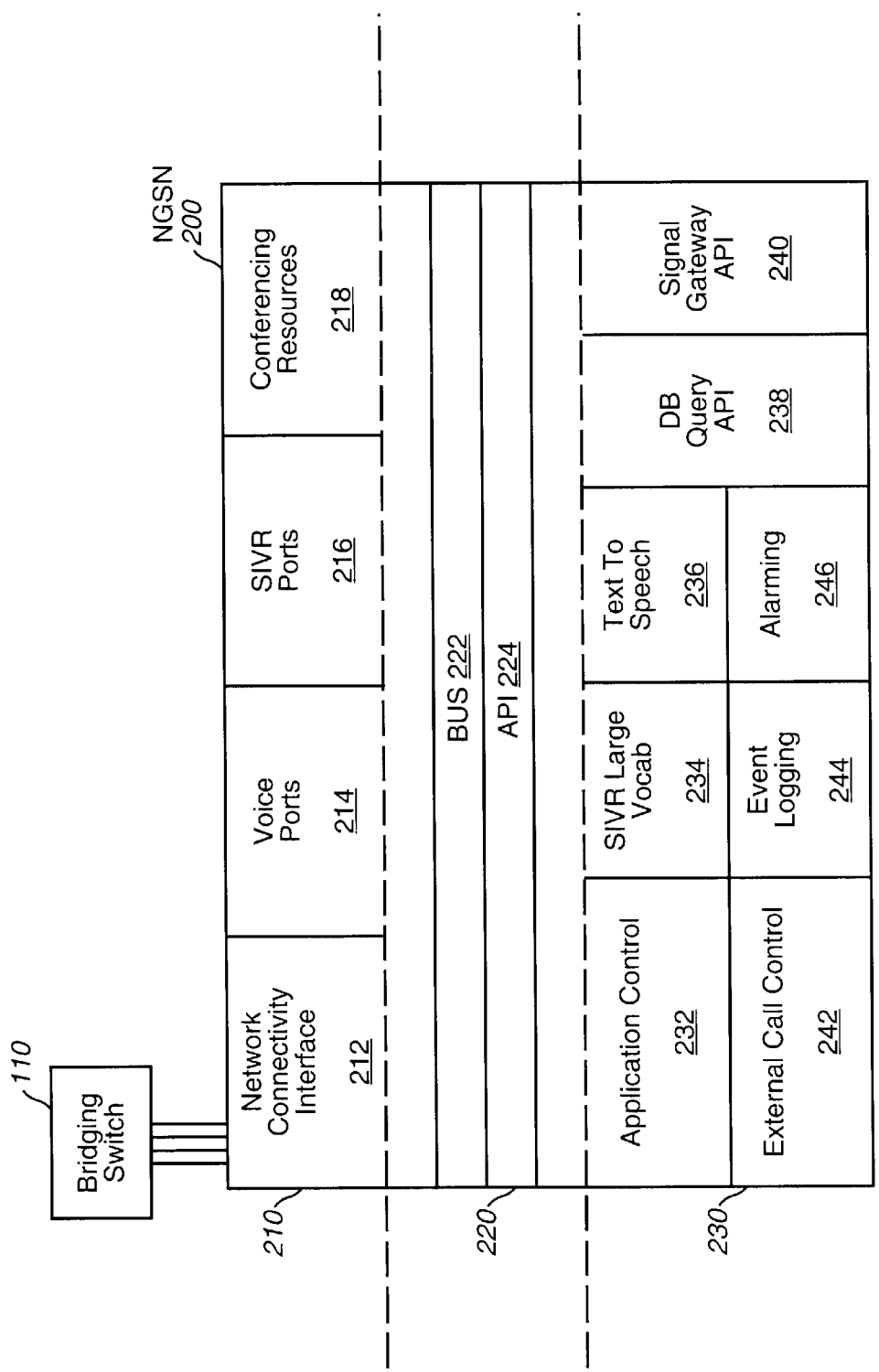
FIG. 2 is a block diagram illustrating the functional architecture of the present invention according to a preferred embodiment.

FIG. 2 is a block diagram illustrating the functional architecture of a NGSN 200 IVR platform. This is a logical diagram which illustrates the encapsulation and modularization of different functions within the NGSN 200. NGSN 200 is connected to a bridging switch 110 which provides access to the switch network. In a preferred embodiment, bridging switch 110 is a Northern Telecom DMS-250 digital matrix switch that supports Release Link Trunk (RLT) voice connections to the NGSN 200 and is well known in the relevant art. The functionality of NGSN 200 may be divided into three functional layers: (1) a first functional layer 210 which represents functions performed by hardware and hardware drivers that face the network; (2) a second functional layer 220 which represents the interface to and control of the network-facing hardware and drivers of the first functional layer 210; and (3) a third functional layer 230 which represents the call processing application software.

The first functional layer 210 of NGSN 200 includes a network connectivity interface 212, voice ports 214, speaker-independent voice recognition (SIVR) ports 216, and conferencing resources 218. Network connectivity interface 212 is the interface to the network, specifically to the bridging switch 110 via voice trunks. In a preferred embodiment, the network connectivity interface 212 is provided by network cards (circuitry) which are well known in the relevant art. These cards provide a physical T3 and T1 communications port, multiplexing and demultiplexing to DS-0 ports, and low-level communications management, such as error correction and echo cancellation. Conferencing resources 218 are also cards that enable the bridging of multiple calls.

The voice ports 214 are logical communications ports that are capable of playing audio recordings for a caller, and recording caller input via Dual Tone Multi Frequency (DTMF) signals. The voice ports 214 may be provided by audio signal processors.

The SIVR ports 216 may be general purpose digital signal processors (DSPs). Small vocabulary SIVR functionality is provided by the physical circuitry (logical communications ports) of application-specific DSPs, and includes simple word recognition such as "yes," "no," "one," "two," etc.

In a preferred embodiment of NGSN 200, the physical components that realize the first functional layer 210 are provided by Dialogic Corporation of Parsippany, N.J. These include cards for the network connectivity interface 212, the voice ports 214 circuits, DSPs for the SIVR ports 216, and the conferencing resources 218.

The second functional layer 220 of NGSN 200 includes a bus 222 and an application program interface (API) 224. The bus 222 provides a physical interface that serves as a switching fabric to the various hardware components and drivers that face the network. This enables the dynamic allocation of network ports to the voice ports 214, the SIVR ports 216, and other functional ports; and the dynamic allocation of functional ports and other first functional layer 210 resources to IVR applications. In a preferred embodiment, the bus 222 is provided by a Dialogic® SCbus which is well known in the relevant art. The SCbus 222 is a software/hardware product that is defined as part of Dialogic's Signal Computing System Architecture (SCSA).

An API is software that an application program uses to request and carry out lower-level services performed by a computer or telephone system's operating system. The API 224 is thus used for driving the resources of first functional layer 210. In a preferred embodiment, the API 224 is an Enterprise Computer Telephony Forum (ECTF) S.100 Framework. The ECTF is a standards body that specifies S.100 as a standard for open APIs between different vendors' computer telephone integration (CTI) products within a processing platform. The S.100 framework (i.e. standard software interrupts, calls, and data formats) enables applications to be portable from one S.100 compliant platform to another.

The third functional layer 230 of NGSN 200 includes an application control 232, a SIVR large vocabulary 234, a text-to-speech function 236, a database query API 238, a signaling gateway API 240, an external call control 242, and event logging 244 and alarming 246 functions. The application control 232 is the function that controls the NGSN's handling of a call. Instructions for performing functions, such as providing an audio response to a caller or collecting caller input or transferring a call, are performed by application control 232. It includes of the processes and data entities (e.g., customer application files and application data) necessary to perform a customer IVR application and process a call.

The SIVR large vocabulary 234 provides software control of SIVR ports 216 (of the first functional layer 210) for large vocabulary SIVR. Large vocabulary SIVR is typically part of an IVR application, and includes the recognition of more complex terms, such as proper names and titles, that are specific to an application. The SIVR ports 216 provide recognition of phonetic sounds, while the SIVR large vocabulary 234 functional component maps these to specific words used by a particular application.

The text-to-speech function 236 provides conversion of textual data to voice recordings in the form of audio files, as well as conversion of speech to text. This is useful for providing text-based fax transmissions of a caller's spoken input. The text-to-speech function 236 is typically performed by software modules within NGSN 200.

The database query API 238 is an open API for use by NGSN 200 in issuing database queries to external network components. Throughout the processing of a call, NGSN 200 may need to query a variety of different databases (e.g., customer or network databases). The database query API 238 provides a single, well-defined API that NGSN 200 may use to issue these queries. No matter what database NGSN 200 needs to query, this single API may be used. Any modifications to an external database will not impact internal NGSN 200 components. The NGSN 200 internal processes continue to use the database query API 238, and therefore require no modification, despite any changes to the structures or interfaces of external databases.

The signaling gateway API 240 is an open API for use by NGSN 200 in communicating with a signaling network. The signaling gateway API 240 encapsulates messages between NGSN 200 and the signaling network. Whatever signaling system (e.g., SS7) is in use by the network is transparent to NGSN 200. The NGSN uses the signaling gateway API 240 exclusively for all functions involved in the interfacing with any signaling system or network. Therefore, a single NGSN 200 design may be deployed in virtually any network, using any signaling system. Further details on the communications of the NGSN 200 via the signaling gateway API 240 are described in a commonly-owned, co-pending application filed concurrently herewith, entitled "Communications Signaling Gateway and System for an Advanced Service Node" having application number TBA (Attorney Docket Number COS-97-044) which is incorporated herein by reference in its entirety.

The external call control function 242 provides an interface to external components of the telecommunications networks in which the NGSN 200 will be deployed. The external call control function 242 is a CTI which communicates with such components as virtual call routers and service control points (SCP). The external call control function 242 is utilized, for example, in two situations: (1) when external component (e.g., SCP) handle calls and determine that the NGSN 200 needs to handle the call; and (2) when the NGSN 200, in the process of servicing a call, determines that it needs to query a SCP.

The event logging function 244 creates records of all events in the handling of calls. These event records are used for reporting, billing, and other purposes. Furthermore, the alarm function 246 generates alarm records for certain conditions that arise during NGSN 200 processing. Because a plurality of NGSN 200 platforms may be networked, these alarms may then be transmitted over the network to a central point of collection. This information is useful in performing network management and monitoring operations.

Physical Implementation

Figure 3:
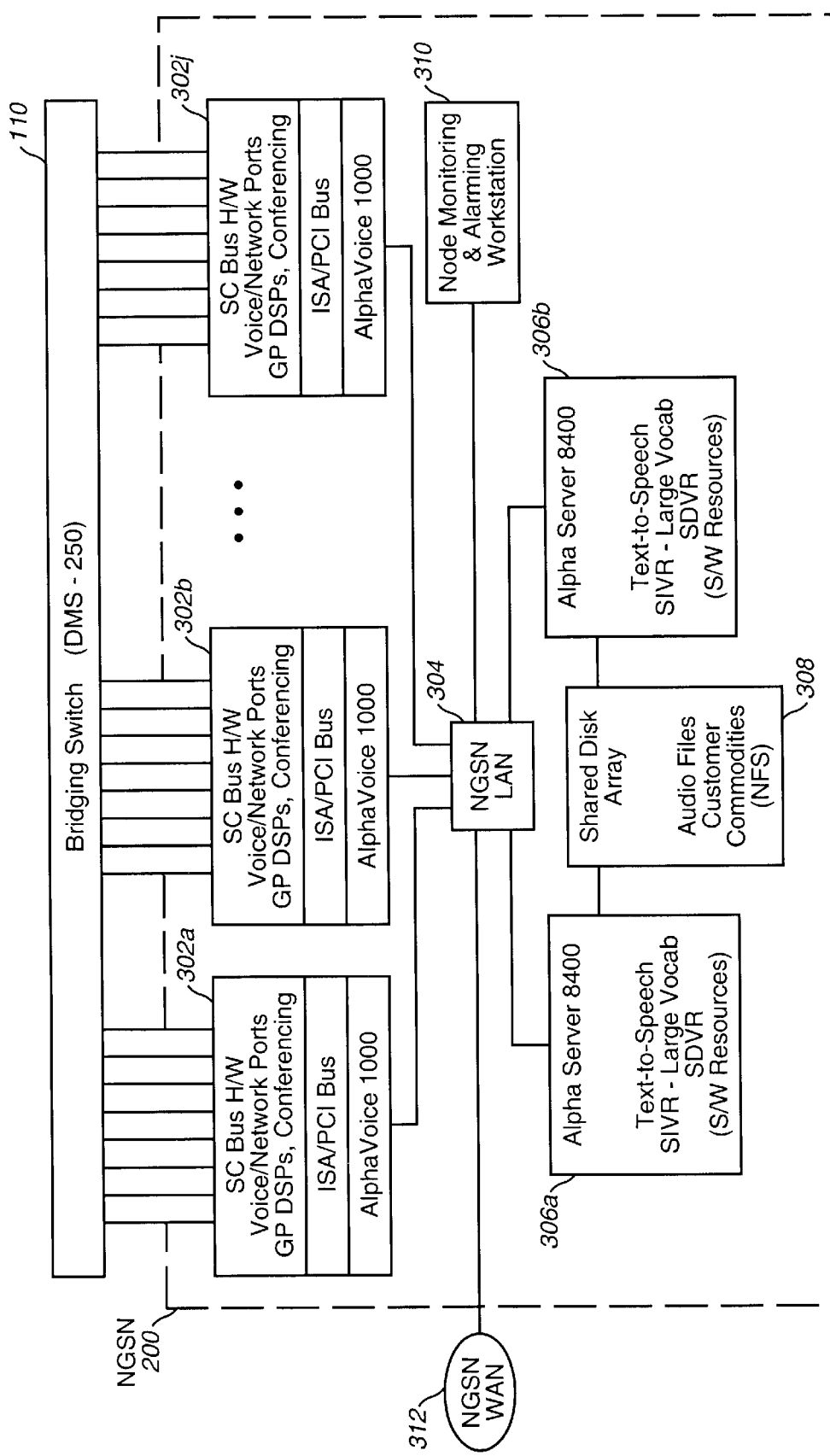
FIG. 3 is a block diagram illustrating the physical architecture of a preferred embodiment of the present invention.

FIG. 3 is a block diagram illustrating the physical architecture of the NGSN 200 IVR platform according to a preferred embodiment. The NGSN 200 is a computing and telephony platform that operates as a service node in a telecommunications network. It includes a pair of redundant application servers 306a and 306b, a shared disk array 308, and a plurality of intelligent peripherals 302. In a preferred embodiment, NGSN 200 will typically contain ten or more intelligent peripherals 302 (shown as intelligent peripherals 302a-302j).

In a preferred embodiment, the intelligent peripherals 302 are computers with telephony ports that connect to the network bridging switch 110 via T1 voice trunks. Their general purpose is to receive calls from the network, provide voice responses to the caller, and collect caller input via DTMF signals or voice recognition. The functions of the intelligent peripherals 302 are controlled by applications on the pair of redundant application servers 306. The components of the first functional layer 210 and the second functional layer 220 (as shown in FIG. 2) are embodied in the intelligent peripherals 302.

In a preferred embodiment, the intelligent peripherals 302 are built using DEC Alpha Voice 1000 computers available from Digital Equipment Corporation of Maynard, Mass. Placed in the DEC Alpha Voice 1000 computers would be the Dialogic Corporation boards that contain network communications ports 212, voice ports 214, SIVR ports 216, and conferencing resources 218. Dialogic® Corporation's SCbus (bus 222), which is the interface for control of the first functional layer 210 resources, would also be placed on the DEC Alpha Voice 1000 computers.

The application servers 306 perform application processing that controls the resources of intelligent peripherals 302. Customer applications reside as command files on the shared disk array 308. When a call is received, an application server 306 calls the appropriate customer application. The customer application specifies high level functions to be performed. The application server 306 calls on service-independent subroutines to perform various functions. This results in commands and files being sent to the particular intelligent peripheral 302 handling the call. The intelligent peripheral 302, in response, plays an audio file for a caller and collects caller input. Further details on the service-independent subroutines and the creation of customer application files are described in a commonly-owned, co-pending application filed concurrently herewith, entitled "System for Executing Advanced Interactive Voice Response Services Using Service-Independent Building Blocks" having application Ser. No. 09/073,885 which is incorporated herein by reference in its entirety.

The components of the third functional layer 230 (as shown in FIG. 2) are embodied in the application servers 306 of NGSN 200. These components provide control of the first functional layer 210 components, which are embodied in the intelligent peripherals 302, via the bus 222 and the API 224 of the second functional layer 220. This architecture, particularly the allocation of functional components between the intelligent peripherals 302 and the application servers 306, enables sharing of application server 306 resources among a plurality of intelligent peripherals 302, providing a highly scaleable architecture. Additional intelligent peripherals 302 are easily added, with no re-engineering required, to augment the port capacity of NGSN 200.

In a preferred embodiment, the application servers 306 are built using two totally redundant DEC Alpha 8400 computers. DEC also provides the shared disk array 308. A Network File System (NFS) may be used to logically map the shared disk array 308 database to external components. The NFS is a common method for logically mapping shared network drives, and is well known in the relevant art. With NFS, an intelligent peripheral 302 may perform direct read/write procedures to the shared disk array 308, using logical addresses. The NFS, a process that resides on each application server 306, maps each logical address to a physical memory address on the shared disk array 308.

The intelligent peripherals 302 and application servers 306 are connected to a NGSN local area network (LAN) 304, which in a preferred embodiment is comprised of a gigabit Ethernet switch or a FDDI switch. The NGSN LAN 304 is connected to a NGSN wide area network (WAN) 312, which in a preferred embodiment is an Ethernet WAN. The WAN 312 allows multiple NGSN 200 platforms to be connected via a single network. Further details on a telecommunications network architecture containing a plurality of NGSNs 200 are described in a commonly-owned, co-pending application filed concurrently herewith, entitled "Telecommunications Architecture for Call Center Services Using Advanced Interactive Voice Response Service Nodes" having application Ser. No. 09/074,096 which is incorporated herein by reference in its entirety.

Also connected to the NGSN LAN 304 is a node monitoring and alarming (management) workstation 310. This performs part of the alarming function 246 identified in FIG. 2. It collects and stores alarms generated by application servers 306 and intelligent peripherals 302, and provides a user interface to these alarms. It also forwards alarms over the WAN 312. The management workstation 310 serves as a central collection point of all alarms generated on an NGSN 200, and forwards them to a central collection point of all alarms generated by the plurality of possible NGSN 200 platforms located on a network connected via WAN 312.

NGSN Deployment and Call Processing Example

Figure 4:
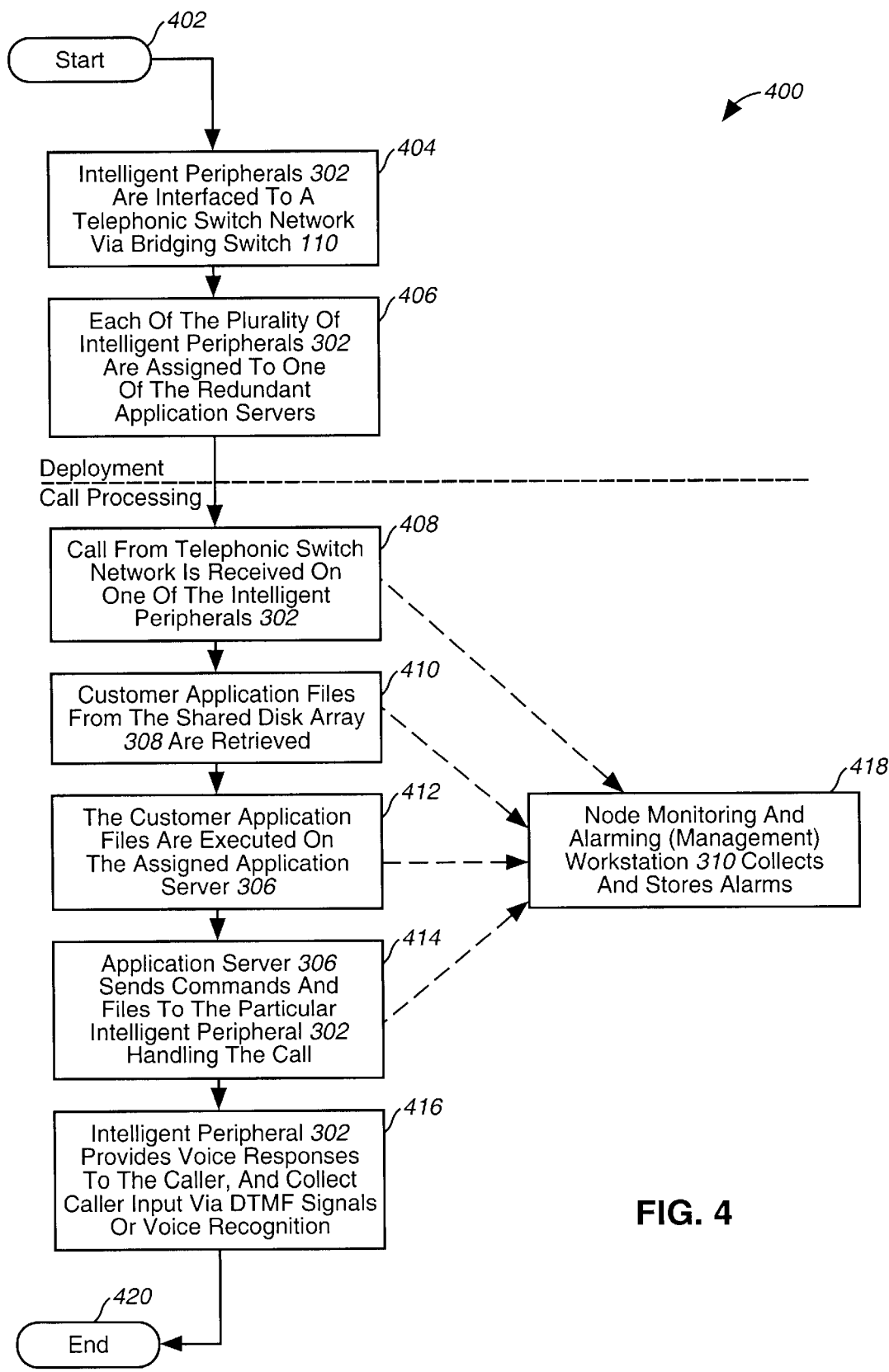
FIG. 4 is a flowchart representing the overall preferred operation of the present invention.

Referring to FIG. 4, NGSN deployment and call processing 400 illustrates the overall top-level operation of the present invention. The NGSN call processing 400 begins at step 402 with control passing immediately to step 404. In step 404, the plurality of intelligent peripherals 302 are interfaced to a telephonic switch network via bridging switch 110. In step 406, each of the plurality of intelligent peripherals 302 are assigned to one of a plurality of redundant application servers. In a preferred embodiment, the intelligent peripherals 302 of the NGSN 200 are numbered. Odd-numbered intelligent peripherals 302 may be assigned to, say application server 306a, and even-numbered intelligent peripherals 302 may be assigned to, say application server 306b.

In step 408, a call from telephonic switch network, via bridging switch 110, is received on one of the plurality of intelligent peripherals 302. Instep 410, the customer application files from the shared disk array 308 are retrieved by the application server 306. In step 412, the customer application files are executed on the assigned application server 306. The application server 306 controls the resources of the intelligent peripheral 302 by sending commands and files to the particular intelligent peripheral 302 handling the call (step 414). This results, at step 416, in the performance of interactive voice response (IVR) services on the intelligent peripheral 302. The intelligent peripheral 302 provides voice responses to the caller, and collect caller input via DTMF signals or voice recognition.

The NGSN deployment and call processing 400 is completed, as indicated by step 420, when the IVR services are completed for the call. However, during NGSN call processing, more specifically steps 408 to 416, the node monitoring and alarming (management) workstation 310 collects and stores alarms generated by the application server 306 and intelligent peripheral 302, and provides a user interface to these alarms (step 418). As explained above, the management workstation 310 serves as a central collection point of all alarms generated on the NGSN 200 and forwards these over the WAN 312.

NGSN Failover

Use of the pair of redundant application servers 306 for the multiple intelligent peripherals 302 enables both failover and load balancing. As mentioned above, in a preferred embodiment, the intelligent peripherals 302 of the NGSN 200 are numbered and assigned to respective application servers 306. In nominal operation, both of the application servers 306 receive function calls from the intelligent peripherals 302, via the NGSN LAN 304. A function call may be to retrieve an audio file from the shared disk array 308 using NFS. But preferably only one of the application servers 306 will handle the function call, based on the numbering scheme. If say application server 306a fails, the other, say application server 306b, will handle the function call. Each of the application servers 306 may be configured to handle 100% of the processing load, but only handles 50% during nominal operation. In other embodiments, NGSN 200 includes more than two application servers 306.

The application servers 306 use the shared disk array 308 with NFS mounting (DEC implementation of NFS and DEC Alpha 8400 processors for file servers). The NFS provides resolution of alias addresses to physical memory addresses on the shared disk array 308, and allows remote read/write procedures. In accordance with NFS, one application server, say 306a, has the primary mount to the shared disk array 308 (for a certain intelligent peripheral 302 function call), and the other, application server, say 306b, has an alias to the shared disk array 308. If one of the application servers 306 fails, the other preferably performs the primary mounts to shared disk array 308 for all of the intelligent peripherals 302.

In order to failover with sufficient speed, each of the application servers 306 monitors the heartbeat of the other across a small computer system interface (SCSI) bus (across the shared disk array 308), from one, say application server 306a, to the shared disk array 308 to the second, say application server 306b. This is an alternative to using the NGSN LAN 304 to monitor heartbeats, which does not provide sufficient speed in detecting loss of heartbeat. Using the SCSI bus from one, say application server 306a to the shared disk array 308 to the second, say application server 306b, NGSN 200 can perform failover in less than two (2) seconds.

The modular architecture of NGSN 200 and specifically the use of the application servers 306 to perform application processing, also enables failover from one of the intelligent peripherals 302 to another. If one, say intelligent peripheral 302a, fails in the middle of a call, the application server 306 maintains call state data, and can cause the transfer of the call to another, say intelligent peripheral 302c. The application server 306 sends a signaling message to the bridging switch 110 via the signaling gateway 240. This message causes the bridging switch 110 to transfer the call to a port on another intelligent peripheral 302. The application server 306 can then resume call processing where it left off, using current call state data.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for providing advanced interactive voice response services for handling telephone calls within a telecommunication network through a service node, the method comprising:

interfacing a plurality of intelligent peripherals to a telephonic switch network;

assigning each of said plurality of intelligent peripherals to one of a plurality of redundant application servers;

receiving a call from said telephonic switch network on one of said plurality of intelligent peripherals;

retrieving customer application files from a shared disk array;

executing said customer application files on one of said plurality of redundant application servers to perform interactive voice response services on said call on one of said plurality of intelligent peripherals;

storing the call state data of said call on one of said plurality of redundant application servers;

detecting a failure in said one of said plurality of intelligent peripherals during said call;

transferring said call from said one of said plurality of intelligent peripherals to another of said plurality of intelligent peripherals, in response to detecting the failure; and resuming execution of said customer application files on said one of the plurality of redundant application servers using the stored call state data.

2. The method of claim 1, further comprising:

collecting alarms from said application servers and said intelligent peripherals; and storing alarms from said application servers and said intelligent peripherals.

3. The method of claim 1, further comprising:

monitoring said plurality of redundant application servers for failure; and switching from one of said plurality of redundant application servers to another of said plurality of redundant application servers, in response to detecting a failure in said one of said plurality of redundant application servers.

4. A service node system for providing advanced interactive voice response services for handling telephone calls within a telecommunications network comprising:

interfacing means for interfacing a plurality of intelligent peripherals to a telephonic switch network;

assigning means for assigning each of said plurality of intelligent peripherals to one of a plurality of redundant application servers;

means for receiving a call from said telephonic switch network on one of said plurality of intelligent peripherals;

retrieving means for retrieving customer application files from a shared disk array;

executing means for executing said customer application files on one of said plurality of redundant application servers to perform interactive voice response services on said call on one of said plurality of intelligent peripherals;

storing means for storing the call state data of said call;

detecting means for detecting a failure associated with said one of said plurality of intelligent peripherals during said call;

transferring means for causing said telephonic switch network to transfer said call from said one of said plurality of intelligent peripherals to another of said plurality of intelligent peripherals, in response to detecting the failure; and resuming means for resuming execution of said customer application files on said one of the plurality of redundant application servers using the stored call state data.

5. The system of claim 4, further comprising:

collecting means for collecting alarms from said application servers and said intelligent peripherals; and storing means for storing alarms from said application servers and said intelligent peripherals.

6. The system of claim 4, further comprising:

monitoring means for monitoring said plurality of redundant application servers for failure; and switching means for switching from one of said plurality of application servers to another of said plurality of redundant application servers, in response to detecting a failure in said one of said plurality of application servers.

7. A system for providing interactive voice response services for handling telephone calls within a telecommunications network, the system comprising:

a plurality of intelligent devices configured to receive calls from a switch, a first intelligent device receiving a first one of the calls from the switch;

a memory device configured to store application files, the application files including information indicating how to process the calls; and a plurality of application servers configured to execute the application files, a first one of the application servers storing call state data relating to the first call, wherein the first application server signals the switch to transfer the first call to another one of the plurality of intelligent devices in response to detecting a failure associated with the first intelligent device and resumes processing associated with the first call using the stored call state data.

8. The system of claim 7, further comprising:

a monitoring device configured to:

store alarm information generated by the plurality of intelligent devices, the memory device and the plurality of application servers, and provide a user interface to the stored alarm information.

9. The system of claim 8, further comprising:

a local area network coupling said plurality of intelligent devices, said plurality of application servers, said memory device and said monitoring device.

10. The system of claim 7, wherein each of the plurality of intelligent devices is assigned to one of the application servers.

11. The system of claim 7, wherein when an application server experiences a failure associated with processing a call, another one of the application servers takes over processing relating to the call.

* * * * *